United States Patent Office 3,370,002
Patented Feb. 20, 1968

3,370,002
RECOVERY OF ORGANIC MATERIAL BY ADSORPTION AND DESORPTION FROM AN ADSORBENT
John E. Cottle, Bartlesville, Okla., assignor to Phillips Petroleum Company, a corporation of Delaware
No Drawing. Filed Apr. 14, 1966, Ser. No. 542,451
9 Claims. (Cl. 208—310)

ABSTRACT OF THE DISCLOSURE

An adsorbed fluid organic material is desorbed from a bed of adsorbent loaded therewith by passing thru the bed a fluid eluent containing previously desorbed organic material to form an eluate, recycling said eluent to said bed to desorb most of said material, passing fresh eluent thru said bed to desorb additional material, prepare the bed for another adsorption step and recover an eluent containing desorbed material, storing said eluent containing desorbed material, again loading the bed with said organic material from a mixture thereof with another organic material, repeating the foregoing desorption steps, and recovering the organic material from the eluate formed by recycling the eluent. The separation of n-paraffins from branched or cyclic paraffins in a mixed feed of these hydrocarbons is a practical illustration of the invention.

---

This invention relates to an improved process or method for recovering organic compounds from a mixture of such compounds by adsorption and desorption using a selective adsorbent for one type of said organic compounds.

The separation of certain types of organic compounds from other types, such as hydrocarbons from a mixture thereof with other types of hydrocarbons, with suitable adsorbents is conventional practice. Aromatics are selectively adsorbed by silica gel, activated carbon, alumina, and the like, and are thus separable from non-aromatics either cyclic or acylic with a selected adsorbent. In this manner, benzene, toluene, and xylenes are separated from petroleum naptha streams using silica gel to recover the aromatic hydrocarbons. Also, straight-chain hydrocarbons are separable from non-straight-chain hydrocarbons using an effective adsorbent. It is conventional to recover normal paraffins from non-normal hydrocarbons, such as branched-chain hydrocarbons, with natural or synthetic zeolites as the adsorbent.

Zeolites, or molecular sieves as they are commonly called, are commercially available with selected, rather uniform pore sizes. Such molecular sieves are particularly adapted to use in the instant invention which is concerned with a more efficient method or process for making hydrocarbon separations by selective adsorption, utilizing an improved method of desorbing the adsorbent.

Once an adsorbent, such as a molecular sieve, is loaded with the selectively adsorbed material, it must be stripped of said material (regenerated) so as to condition the adsorbent for another adsorption step. A common method of stripping the adsorbent or desorbing the desired material adsorbed therein comprises passing a more selectively adsorbed eluent thru the adsorbed bed to displace said material. This step requires substantial amounts of eluent and, also, considerable heat requirements in distilling the eluent from the eluate.

This invention is concerned principally with an improved method of desorbing an adsorbed material from a solid adsorbent which conserves heat and requires the handling of smaller volumes of eluent than prior art methods.

Accordingly, it is an object of the invention to provide an improved method or process for desorbing an organic material selectively adsorbed on a solid adsorbent. Another object is to provide an improved process for alternately desorbing a selectively adsorbed organic material of an organic mixture from a solid adsorbent and adsorbing another load of said material. A further object is to provide a desorption process which requires a lower volume of eluent for desorbing an organic material from a solid adsorbent loaded with said material and lower heat requirements for recovering said material from the eluate. It is also an object of the invention to provide an improved process for separating normal paraffins from a mixture thereof with non-normal paraffins by selective adsorption in a fixed bed of particulate solid adsorbent, such as a molecular sieve, and more economically desorbing and recovering the selectively adsorbed material from the sieve. Other objects of the invention will become apparent to one skilled in the art upon consideration of the accompanying disclosure.

A broad aspect of the invention comprises passing a fluid eluent thru a bed of absorbent loaded with an organic material selectively adsorbed therein so as to desorb adsorbed material therefrom; recycling the eluate or the eluent containing the desorbed material to said bed until most of said material is desorbed therefrom; thereafter passing fresh eluent thru said bed to desorb additional said material and prepare said bed for new adsorption of the organic material therein; storing the eluent recovered from the bed during the step of passing fresh eluent therethru; again loading said bed with said organic material from a mixture thereof with another organic material; repeating the first desorption step including recycling of eluent, using as said eluent the stored eluent; and recovering the desorbed organic material from the eluate obtained during the recycling phase of the process. Most of the adsorbed organic material is recovered in the eluate during the recycling phase of the desorption and only the resulting mixture of eluate is subjected to separation, preferably by fractionation, to recover the organic material from the eluent. This procedure materially reduces the volume of eluate fractionated and the heat requirements for the elution step itself.

The invention is applicable to the separation of any mixture of organic compounds in which any component or system of components is selectively adsorbed on a specific adsorbent so as to leave a remaining component or component system unadsorbed as the raffinate. The adsorbed material is then desorbed with a selected eluent, utilizing the recycle feature of the invention, and the desorbed material is separated from the eluate by fractionation or other suitable means. Thus, the process is applicable to the separation of alcohols, ketones, aldehydes, etc.; the separation of certain types of hydrocarbons from other types; and the separation of impurities from hydrocarbons, alcohols, ketones, aldehydes, etc. To illustrate, aldehydes may be separated from a mixture thereof with conjugated dienes including 1,3-butadiene, isoprene, piperylene, etc. Such separations are disclosed in the copending application of Ralph C. Farrar, Jr., Ser. No. 516,743, filed December 27, 1965.

The invention is particularly adapted to the saparation of normal paraffinic hydrocarbons from non-normal paraffins, specifically, branched-chain hydrocarbons of similar boiling range, by adsorption of the n-paraffins on a molecular sieve adsorbent having an effective pore size of about 5 angstroms or in the range of 5 to 6 angstroms. The normal paraffins may range from $C_4$ to $C_{20}$ and higher in admixture with similar-boiling-range aromatics and/or branched-chain hydrocarbons. A preferred feed is a paraffinic naphtha having a boiling range of about 300–400° F. and containing $C_{10}$ to $C_{15}$ or $C_{16}$ n-paraffins in a concentration in the range of about 10 to 50 volume percent, the remainder being principally branched-chain paraffins. Another desirable feed is a kerosene stream from which the n-paraffins are readily preferentially adsorbed from the non-normal paraffins. In this separation process, n-heptane is the preferred eluent.

The proper eluent for desorbing any given organic material is well known in the art and is not a part of the invention. Generally, when desorbing an adsorbent loaded with a given hydrocarbon compound or mixture of hydrocarbons of a range of molecular weights or a range of carbon atoms per molecule, a lighter hydrocarbon is used as the eluent to displace the adsorbed hydrocarbon(s) from the adsorbent. To illustrate, when desorbing an adsorbent loaded with $C_{10}$ to $C_{16}$ n-paraffins, an n-paraffin of 4 to 8 carbon atoms per molecule is usually preferred as the eluent. However, lighter normal and branched-chain paraffins may be utilized as the eluent. To further illustrate the invention, when adsorbing $C_{10}$ to $C_{16}$ n-paraffins from kerosene, leaving the non-normal paraffins including branched-chain hydrocarbons and aromatics in the raffinate, the adsorbent loaded with the $C_{10}$ to $C_{16}$ n-paraffins is advantageously desorbed by passing n-heptane thru the adsorbent bed.

In the separation and recovery of normal paraffins from a mixture thereof with non-normal paraffins including branched-chain paraffins and aromatics, particularly in the recovery of $C_{10}$ to $C_{16}$ n-paraffins, the feed is heated to a temperature in the range of 400–800° F. so as to vaporize same and the vaporized feed is passed thru a column packed with a fixed bed of adsorbent selective for the adsorption of the normal paraffins, such as a molecular sieve. The loading of the adsorbent is effected at a pressure in the range of atmospheric to above 500 p.s.i.g. and, preferably, in the range of 20–50 p.s.i.g. The non-normal paraffins are recovered in the raffinate. When normal paraffins begin to appear in the raffinate in any readily discernible concentration (determined by a conventional analyzer such as a chromatograph or refractive index device), feed to the column is shut off and eluent from a previous desorption phase of the process, hereinafter described, is passed thru the column to desorb the normal paraffins. This eluent is recycled until most of the n-paraffins are desorbed from the adsorbent. Thereafter, fresh eluent (free of $C_{10}$ to $C_{16}$ paraffins) is passed thru the column so as to further free the adsorbent of n-paraffins and prepare the column for another loading step. It is this eluent utilized in the final phase of the desorption step that is used as the eluent in the first phase of the next desorption step using recycle of the eluent to desorb the major portion of the n-paraffins. When utilizing n-heptane as the eluent, the eluate from the recycle phase of the operation is passed to a fractionation column to separate the n-heptane from the heavier hydrocarbons which are recovered as a product of the process and the overhead stream of n-heptane is then utilized as the fresh eluent of the last phase of the desorption step.

The principal advantage accruing to the invention are the substantial reduction in volume of eluate which must be fractionated to separate the desorbed hydrocarbon from the eluent, thereby reducing heat requirements for the elution step itself and handling costs.

The system is usually operated in vapor phase but it is also feasible to operate in liquid phase with some types of separations and with certain adsorbents.

The data presented in the table below illustrate operation in accordance with the invention as compared to operation in conventional manner in the desorption of $C_{10}$ to $C_{15}$ normal paraffins from a molecular sieve bed of adsorbent loaded by passing therethru a kerosene feed. Quantities are given in pound-moles per hour.

TABLE

|  | Feed | Normal Paraffin Product | Raffinate Product | Eluate to Paraffin Recovery | Fractionated Eluent | Recycle Eluent |
|---|---|---|---|---|---|---|
| Old Method: |  |  |  |  |  |  |
| n-$C_7$ |  |  |  | 560 | 560 |  |
| $C_{10-15}$ (non-normal) | 281 | 1 | 280 | 1 |  |  |
| $C_{10-15}$ (normal) | 75 | 69 | 6 | 69 |  |  |
|  | 356 | 70 | 286 | 630 | 560 |  |
| New Method: |  |  |  |  |  |  |
| n-$C_7$ |  |  |  | 373 | 373 | 187 |
| $C_{10-15}$ (non-normal) | 281 | 1 | 280 | 1 |  | 0.5 |
| $C_{10-15}$ (normal) | 75 | 69 | 6 | 69 |  | 35 |
|  | 356 | 70 | 286 | 443 | 373 | 222.5 |

The stream in the last column identified as "Recycle Eluent" is the stream that precedes the "Fractional Eluent" to the loaded bed which is ready for n-paraffin stripping. The considerably lower volumes of n-heptane are passed to the fractionator in the method of the invention as clearly demonstrated in the above table (373 as compared to 560 pound-moles per hr.).

Certain modifications of the invention will become apparent to those skilled in the art and the illustrative details disclosed are not to be construed as imposing unnecessary limitations on the invention.

I claim:

1. A process for desorbing and recovering an adsorbed fluid organic material from a solid bed of adsorbent selective for said material and loaded therewith which comprises the steps of:
    (1) passing a fluid eluent containing previously desorbed organic material thru said bed so as to desorb adsorbed material and form an eluate;
    (2) recycling said eluate to said bed until most of said material is desorbed therefrom;
    (3) passing fresh eluent thru said bed to desorb additional said material and prepare said bed for new adsorption of said organic material thereon and to recover an eluent containing desorbed organic material;
    (4) storing the eluent recovered from step (3);
    (5) again loading said bed with said organic material from a mixture thereof with another organic material;
    (6) repeating steps (1) and (2) using as said eluent the stored eluent of step (4); and
    (7) recovering said organic material from the eluate of step (2).

2. The process of claim 1 wherein said organic material is a hydrocarbon material, said mixture of step (5) includes at least one other hydrocarbon material, and said eluent is a hydrocarbon of lower molecular weight than the hydrocarbon materials.

3. The process of claim 2 wherein first said hydrocarbon material is at least one normal paraffin and said mixture of step (5) includes at least one non-normal hydrocarbon.

4. The process of claim 1 wherein said organic material is a mixture of normal paraffins of at least 4 carbon atoms per molecule and said mixture of step (5) is a mixture of non-normal hydrocarbons.

5. The process of claim 4 wherein said adsorbent is a molecular sieve.

6. The process of claim 1 wherein said organic material is a mixture of normal paraffins of principally 10 to 16 carbon atoms per molecule, said mixture of step (5) is kerosene, and said eluent is a substantially lighter hydrocarbon preferentially adsorbed on said adsorbent.

7. The process of claim 6 wherein said adsorbent is a molecular sieve.

8. The process of claim 1 wherein said organic material is a mixture of normal paraffins of principally 10 to 16 carbon atoms per molecule and the mixture of step (5) includes said normal paraffins and non-paraffins of a similar molecular weight range, said adsorbent is a molecular sieve, and said eluent is an n-paraffin of 4 to 8 carbon atoms per molecule.

9. The process of claim 1 including the steps of:

(8) passing the eluate from step (2) to a fractionation zone to separately recover eluent and desorbed material; and (9) passing recovered eluent from step (8) to step (3) as said fresh eluent.

References Cited

UNITED STATES PATENTS

| | | | |
|---|---|---|---|
| 2,646,451 | 7/1953 | Rommel | 208—310 |
| 2,956,089 | 10/1960 | Mattox et al. | 208—310 |
| 2,975,222 | 3/1961 | Findlay | 208—310 |
| 3,083,245 | 3/1963 | Lindahl | 260—676 |
| 3,309,415 | 3/1967 | Young et al. | 208—310 |

HERBERT LEVINE, *Primary Examiner.*